(12) United States Patent
Nagai

(10) Patent No.: US 7,876,660 B2
(45) Date of Patent: Jan. 25, 2011

(54) OPTICAL PICKUP APPARATUS

(75) Inventor: Fumio Nagai, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 739 days.

(21) Appl. No.: 11/781,735

(22) Filed: Jul. 23, 2007

(65) Prior Publication Data

US 2008/0025189 A1 Jan. 31, 2008

(30) Foreign Application Priority Data

Jul. 26, 2006 (JP) ............................. 2006-203407

(51) Int. Cl.
*G11B 7/00* (2006.01)
(52) U.S. Cl. ...................... 369/112.16; 369/112.17; 369/112.19; 369/112.01; 369/112.03
(58) Field of Classification Search ............ 369/112.16, 369/112.17
See application file for complete search history.

(56) References Cited

U.S. PATENT DOCUMENTS 6,775,221 B1 * 8/2004 Fukumoto .............. 369/112.16
7,660,226 B2 * 2/2010 Ogata .................... 369/112.18
2006/0013107 A1 * 1/2006 Nishiwaki et al. ...... 369/112.01
2006/0114796 A1 * 6/2006 Maruyama et al. ..... 369/112.01

FOREIGN PATENT DOCUMENTS

EP            1 304 689       4/2003
WO      WO2006093326     *  9/2006

* cited by examiner

*Primary Examiner*—Lixi Chow
(74) *Attorney, Agent, or Firm*—Finnegan, Henderson, Farabow, Garrett & Dunner, L.L.P.

(57) ABSTRACT

An optical pickup apparatus includes: a first light source for emitting a first light flux; a light-converging optical system including an objective lens and a diffractive structure. When the first light flux from an optical information recording medium enters into the diffractive structure, the diffractive structure emits a main light flux and a secondary light flux. The optical pickup apparatus further includes: a first optical element including a first optical area and a second optical area; a second optical element including a third optical area and a fourth optical area; a light-converging element for converging the main light flux at a position between the first optical element and second optical element; a polarization splitting optical member for splitting the main light flux and the secondary light flux each emitted from the first optical element and second optical element; and a photodetector for receiving the main light flux.

7 Claims, 5 Drawing Sheets

OPTICAL PICKUP APPARATUS

This application is based on Japanese Patent Application No. 2006-203407 filed on Jul. 26, 2006, in Japanese Patent Office, the entire content of which is hereby incorporated by reference.

TECHNICAL FIELD

The present invention relates to an optical pickup apparatus for recording and/or regenerating information using diffracted light.

BACKGROUND

In recent years, tendency of a shorter wavelength of laser bean as a light source which has been used to record and/or reproduce information for optical discs in the optical pickup apparatus, has become a main stream. For example, various blue-violet laser light sources have been made practical. Information of 15 to 20 GB can be recorded on the optical disc having a diameter of 12 cm by using these blue-violet light sources and an objective lens having NA (Numerical aperture) which is the same as a DVD (Digital Versatile Disc). When NA is increased to 0.85, information of about 25 GB can be recorded onto the optical disc having a diameter of 12 cm. In this specification, the optical disc and an optical-magnetic disc using a blue-violet laser light source are called "a high density optical disc".

Hereupon, the high density optical disc using the objective lens with NA of 0.85, has larger coma caused due to the skew of the optical disc. Therefore some high density optical discs using the objective optical element with NA of 0.85, are designed so that the protective layer has thinner thickness (which is 0.1 mm, while that of DVD is 0.6 mm) than that of DVD to reduce the comma due to the skew. On the other hand, it is sometimes considered that a product, such as an optical disc player/recorder, which is capable of only recording/reproducing information for the above high-density optical disc is worthless. Taking account of a fact that, at present, DVDs and CDs (Compact Disc), onto which various kinds of information have been recorded, are on the market, the value of the product as a high-density optical disc player/recorder is increased by, for example, enabling to appropriately record/reproduce information additionally for DVDs and CDs, which a user possesses. From these backgrounds, the optical pickup apparatus installed in the high-density optical disc player/recorder is required to be capable of appropriately recording/reproducing information not only for a high-density optical disc but also a DVD and a CD.

It can be considered, as a method by which the information can be adequately recorded/reproduced while the compatibility is maintained also to anyone of the high density optical disc and DVD and further to CD, a method to selectively switch the optical system for the high density optical disc and the optical system for DVD and CD corresponding to the recording density of the optical disc to which the information is recorded/reproduced. However, it requires a plurality of optical systems, which is disadvantageous for the size-reduction and which increases the cost.

Accordingly, in order to simplify the structure of the optical pickup apparatus and to intend the reduction of cost, it is preferable to make an optical system for the high density optical disc an optical system for DVD and CD into a common optical system, and to reduce the number of optical parts contributing the optical pickup apparatus as much as possible, even when the optical pickup apparatus has compatibility. Then, providing the common objective optical element which is arranged with facing an optical disc, is most advantageous for the simplification of the construction or cost reduction of the optical pickup apparatus. Here, in order to obtain the common objective optical element for plural kinds of optical discs which use different wavelengths for recording/reproducing information, it is required that the objective optical system is provided with a phase structure having a wavelength dependency for the spherical aberration, which is formed thereon.

European patent application EP-A 1304689 discloses an objective optical system which has the diffractive structure as a phase structure and can be commonly used for the high density optical disc and the conventional DVD and CD, and also discloses an optical pickup apparatus in which this objective optical system is mounted.

Herein, compatibility between different optical discs can be ensured in the optical pickup apparatus written in EP-A 1304689 by designing the diffractive structure of the objective optical system so as to change a diffraction angle according to the wavelength of a light flux which passes through the diffractive structure. However, most diffractive structures for such optical pickup apparatus are generally designed so as to provide an excellent light utilization efficiency when it is used for, for example, the high-density optical disc or DVD. Particularly, when the information recording light for CD enters into the diffractive structure, the diffractive structure sometimes generate unnecessary diffracted light with a diffraction order which is different from the predetermined diffraction order of the diffracted light which is used for information recording and/or reproducing in addition to the diffracted light used for information recording and/or reproducing. When the unnecessary diffracted light enters into a photodetector, there is a fear that some trouble over correct signal reading may be caused.

SUMMARY

The present invention is achieved with the foregoing problem of the prior art in view and is intended to provide an optical pickup apparatus capable of effectively removing unnecessary diffracted light generated by the diffractive structure.

An optical pickup apparatus according to the present invention is provided for recording and/or reproducing information by converging a light flux with a wavelength of λ1 emitted from a light source through a light-converging optical system including an objective lens on a first optical information recording medium comprising a protective layer with a thickness t1. The optical pickup apparatus includes: a first light source; and a light-converging optical system including an objective lens and an optical surface with a diffractive structure. When the light flux reflected from the information recording surface of the first optical information recording medium enters into the diffractive structure, the diffractive structure emits a main light flux and a secondary light flux. The optical pickup apparatus further includes a first optical element comprising a first optical area and a second optical area; a second optical element comprising a third optical area and a fourth optical area; and a light-converging element for converging the main light flux at a position between the first optical element and the second optical element. The optical pickup apparatus further includes a polarization splitting optical member for splitting the main light flux and the secondary light flux; and a photodetector for receiving the main light flux.

In the optical pickup apparatus, the main light flux passing through the first optical area and the fourth optical area has a first polarization direction, and the light flux passing through the second optical area and the third optical area has a first polarization direction. The secondary light flux passing through the first optical area and the third optical area has a second polarization direction and the secondary light flux passing through the second optical area and the fourth optical area has a second polarization direction.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 1:
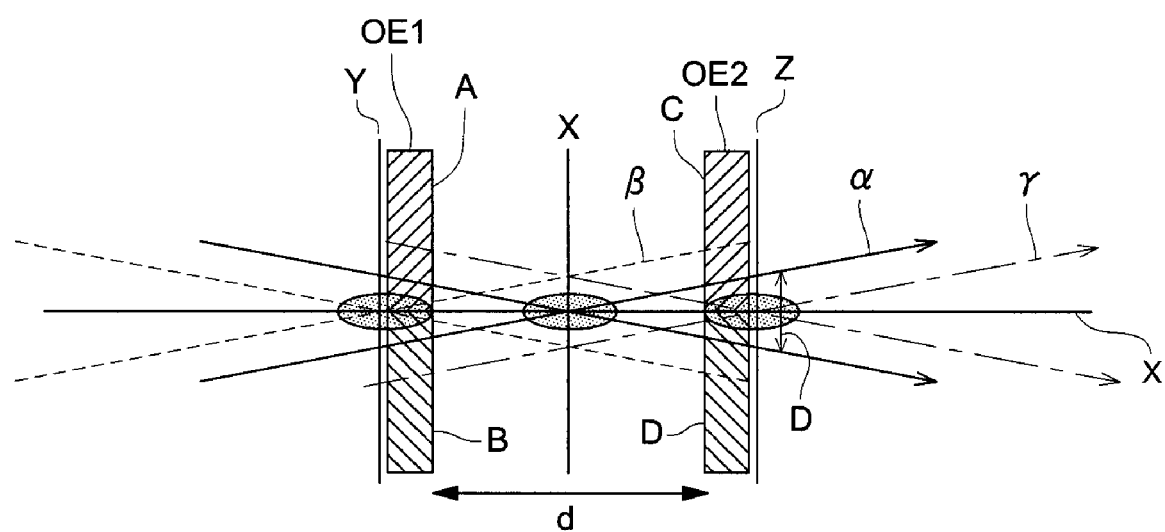
FIG. 1 is a drawing for explaining the principle of the present invention.

DESCRIPTION OF THE PREFERRED
EMBODIMENT

The preferred embodiment of the present invention is described below.

An optical pickup apparatus according to the present invention is an optical pickup apparatus for recording and/or reproducing information on a first optical information recording medium comprising a protective layer with a thickness t1. The optical pickup apparatus includes: a first light source for emitting a first light flux with a wavelength of $\lambda 1$ and a light-converging optical system. The light-converging optical system is provided for converging the first light flux onto an information recording surface of the first optical information recording medium and the light-converging optical system includes an objective lens and an optical surface comprising a diffractive structure. When the first light flux reflected from the information recording surface of the first optical information recording medium enters into the diffractive structure, the diffractive structure emits a main light flux which is a diffracted light flux with a predetermined diffraction order and a secondary light flux which is a diffracted light flux with a diffraction order being different from the predetermined diffraction order. The optical pickup apparatus further includes a first optical element including a first optical area and a second optical area which are arranged on both sides of an optical axis; a second optical element comprising a third optical area and a fourth optical area which are arranged on both sides of the optical axis; and a light-converging element for converging the main light flux at a position between the first optical element and the second optical element. The optical pickup apparatus further includes a polarization splitting optical member for splitting the main light flux and the secondary light flux each emitted from the first optical element and the second optical element; and a photodetector for receiving the main light flux.

The optical pickup apparatus records and/or reproduces information by converging the first light flux on an information recording surface of the first optical information recording medium through the light-converging optical system.

In the optical pickup apparatus, the first optical area and the fourth optical area provide a first polarization direction with the main light flux passing through the first optical area and the fourth optical area, and the second optical area and the third optical area provide a first polarization direction with the main light flux passing through the second optical area and the third optical area. Furthermore, the first optical area and the third optical area provide a second polarization direction with the secondary light flux passing through the first optical area and the third optical area, and the second optical area and the fourth optical area provide a second polarization direction with the secondary light flux passing through the second optical area and the fourth optical area.

When the main light flux reflected by the information recording surface of the first optical information recording medium enters into the diffractive structure, the main light flux emitted from the diffractive structure passes through the first optical element. Then, the main light flux is converged between the first optical element and the second optical element by the light-converging element. The main light flux passes through the second optical element, and enters into the photodetector through the polarization splitting optical member.

When the secondary light flux reflected by the information recording surface of the first optical information recording medium enters into the diffractive structure, the secondary light flux emitted from the diffractive structure passes through the first optical element. Then, the secondary light flux is not converged between the first optical element and the second optical element by the light-converging element, and passes through the second optical element. The secondary light flux does not enter into the photodetector by being branched by the polarization splitting optical member.

In the present specification, "an optical axis" means the center of the light flux passing through an element.

The principle of the present invention will be explained with reference to FIG. 1. FIG. 1 shows a partial cross sectional view in the optical axial direction of an optical pickup apparatus relating to the present invention. In the partial cross sectional view, the first optical element OE1 includes a first optical area A above an optical axis X and a second optical area B below the optical axis X. In other words, the first optical area A and the second optical area B are arranged so as to sandwich the optical axis X. Further, the second optical element OE2 positioned at a predetermined distance d from the first optical element OE1 along the optical axis has a third optical area C above the optical axis X and a fourth optical area D below the optical axis. In other words, the third optical area C and the fourth optical area D are arranged so as to sandwich the optical axis X. Each of the optical areas A to D has a function for causing a phase difference of $\lambda/4$ to the light flux which passing through each optical area. The optical areas A and B cause phase difference in the opposite directions to each other and the optical areas C and D cause phase difference in the opposite directions to each other. Further, the optical areas A and C which face to each other cause phase difference in the opposite directions to each other and the optical areas B and D which face to each other also cause phase difference in the opposite directions to each other. As a concrete example, it may be considered that these optical areas provide a phase difference of +λ/4 with the light flux passing through the first optical area A, and provide a phase difference of −λ/4 with the light flux passing through the second optical area B. Further, it may be considered that these optical areas provide a phase difference of −λ/4 with the light flux passing through the third optical area C, and provide a phase difference of +λ/4 with the light flux passing through the fifth optical area D. Another example can be considered that these optical areas provide a phase difference of +λ/2 with the light flux passing through the first optical area A, provide no phase difference with the light flux passing through the second optical area B, provide a phase difference of +λ/2 with the light flux passing through the third optical area C, and provide no phase difference with the light flux passing through the fourth optical area D.

Here, it is assumed that from the left of FIG. 1, the reflected light in the linear polarization state is emitted from the information recording surface of the optical information recording medium. In FIG. 1, solid lines indicate a marginal light beam α of the diffracted light flux with the predetermined diffraction order which has passed through the diffractive structure of the objective lens, and dotted lines indicate a marginal light beam β of a diffracted light flux with a diffraction order which differs from the predetermined diffraction order, and dashed-dotted lines indicate a marginal light beam γ of another diffracted light flux with a diffraction order which differs from the predetermined diffraction order. Namely, the diffracted light flux having the marginal light beam α is normal information recording light and each of diffracted light fluxes having the marginal light beams β and γ is a noise component light.

When the light flux having the marginal light beam α is converged at a position X between the first optical element OE1 and the second optical element OE2 along the optical axial, the light flux having the marginal light beam β is converged at a position Y on the optical information recording medium side (on the left of FIG. 1) from the position X, and the light flux having the marginal light beam γ is converged at a position Z on the photodetector side (on the right of FIG. 1) from the position X.

Therefore, out of the light flux having the marginal light beam α, the light portion passing the first optical area A always passes the fourth optical area D, and furthermore, the light portion passing the second optical area B always passes the third optical area C. Therefore, the light flux having the marginal light beam α after emitted from the second optical element OE2 is different by 90° in the polarization direction (the first polarization direction) from that before entering the first optical element OE1.

On the other hand, out of the light flux having the marginal light beam β, the light portion passing the first optical area A passes the third optical area C, and furthermore, the light portion passing the second optical area B passes the fourth optical area D. Therefore, the light flux having the marginal light beam β after emitting from the second optical element OE2 is not changed in the polarization direction (the second polarization direction different from the first polarization direction) from that before entering the first optical element OE1.

Similarly, out of the light flux having the marginal light beam γ, the light portion passing the first optical area A passes the third optical area C, and furthermore, the light portion passing the second optical area B passes the fourth optical area D. Therefore, the light flux having the marginal light beam γ after emitting from the second optical element OE2 is not changed in the polarization direction (the second polarization direction different from the first polarization direction) from that before entering the first optical element OE1.

As mentioned above, the normal information recording light (may be referred to as a main light flux) and the noise component light (may be referred to as a secondary light flux) are different in the polarization direction, for example, by 90°. Therefore, when making the outgoing light flux from the second optical element OE2 pass through a polarization splitting optical member such as a polarized beam splitter, for example, the polarization splitting optical member reflects the normal information recording light and transmits the noise component light, thus the noise component can be removed. Alternatively, it is also possible to transmit the normal information recording light and lead it to the photodetector and reflect the noise component light. Further, the polarization splitting optical member is not limited to the polarized beam splitter. For example, a linear polarization plate for passing only the normal information recording light in a predetermined polarization state may be used.

In the optical pickup apparatus relating to the present invention, when the main light flux entering into the first optical element has a light amount Im at a first optical information recording medium side of the first optical element, and the secondary light flux entering into the first optical element has a light amount Is at a first optical information recording medium side of the first optical element, the light amount Im and the light amount Is may satisfy the expression (5).

$$Is/Im > 0.20 \quad (5)$$

In the conventional optical pickup apparatus, when a secondary light flux as a noise component light has a larger light amount Is against a light amount Im of the main light flux among the light flux entering into the photodetector, there was a possibility that the optical pickup apparatus cannot read recorded information correctly from the optical information recording medium. With employing an optical pickup apparatus relating to the present invention, the secondary light flux can be removed even when the light amount Is is large to the certain extent. Therefore, recorded information can be read properly from the optical information recording medium. For example, when the light amount Is satisfies the expression (5), an optical pickup apparatus relating to the present invention can be utilized effectively.

In the optical pickup apparatus relating to the present invention, when the first light flux reflected by the information recording surface of the first optical information recording medium enters into the diffractive structure, a diffracted light flux with the predetermined diffraction order emitted by the diffractive structure has a diffraction efficiency of DEm, and a diffracted light flux having a maximum diffraction efficiency among diffracted light fluxes with any other diffraction order than the predetermined diffraction order emitted by the diffractive structure has a diffraction efficiency of DEs, and the diffraction efficiencies DEm and DEs may satisfy the expression (6).

$$DEs/DEm > 0.20 \quad (6)$$

Out of the light flux emitted from the information recording surface of the optical information recording medium, the main light flux to be signal light is diffracted by the diffractive structure in the light-converging optical system as a diffracted light with the predetermined diffraction order. The diffracted light flux is assumed to have a diffraction efficiency DEm. At the same time, the diffractive structure also generates one or more diffracted light fluxes with another diffraction order. Among the diffracted light fluxes, the diffracted light flux having the maximum diffraction efficiency is assumed to have a diffraction efficiency DEs. When the diffraction efficiency DEs is larger comparing to the diffraction efficiency DEm, there is a possibility that the diffracted light flux with the diffraction efficiency DEs works as a noise component light on a photodetector and the optical pickup apparatus cannot recorded information correctly from the optical information recording medium.

For example, an optical pickup apparatus which compatible from DVD and CD is considered. The optical pickup apparatus is assumed to include a light source of wavelength 650 nm for DVD and a light source of wavelength 780 nm for CD, and to be designed so as to use a fourth order diffracted light for recording and/or reproducing information for DVD and use a third order diffracted light for recording and/or reproducing information for CD. When the optical pickup apparatus is designed so as to optimize the diffraction efficiency of light for DVD, the diffracted light used for recording and/or reproducing information for DVD has a diffraction efficiency of 100%, the diffracted light used for recording and/or reproducing information for CD has a diffraction efficiency of 70%. When a light flux from the light source for CD is diffracted, the diffracted light flux used for recording and/or reproducing information for CD and a diffracted light flux with the unused diffraction order (fourth order) are generated at the same time. The diffracted light flux with the unused diffraction order has a diffraction efficiency of about 16%.

As another example, an optical pickup apparatus which compatible for BD, DVD and CD is considered. The optical pickup apparatus is assumed to further include a light source of wavelength 405 nm for BD, and to be designed so as to use a third order diffracted light for recording and/or reproducing information for BD, to use a second order diffracted light for recording and/or reproducing information for DVD, and to use a second order diffracted light for recording and/or reproducing information for CD. In the optical pickup apparatus, the diffracted light used for recording and/or reproducing information for BD has a diffraction efficiency of 93%, the diffracted light used for recording and/or reproducing information for DVD has a diffraction efficiency of 95%, the diffracted light used for recording and/or reproducing information for CD has a diffraction efficiency of 50%. When a light flux from the light source for CD is diffracted, the diffracted light flux used for recording and/or reproducing information for CD and a diffracted light flux with the unused diffraction order (first order) are generated at the same time. The diffracted light flux with the unused diffraction order has a diffraction efficiency of about 28%.

As described above, it can be found that an unused light coming from the light flux, which is different from the main light flux used for information recoding and/or reproducing, travels in the optical pickup apparatus.

With employing an optical pickup apparatus relating to the present invention, the light flux (unused light) with unused diffraction order emitted from the diffractive structure can be removed with the polarization splitting optical element. Therefore, recorded information can be read properly from the optical information recording medium even when the diffraction efficiency DEs is large to the certain extent. For example, when DEs/DEm satisfies the expression (6), an optical pickup apparatus relating to the present invention can be utilized effectively.

The optical pickup apparatus relating to the present invention may further includes: a second light source for emitting a second light flux with a wavelength of λ2 (λ2<λ1). In the optical pickup apparatus, the light-converging optical system converges the second light flux on an information recording surface of a second optical recording medium comprising a protective layer with a thickness of t2 (t2<t1). It allows the optical pickup apparatus to compatibly record and/or reproduce information for different optical information recording media.

In the optical pickup apparatus relating to the present invention, the light-converging optical system may converge the first light flux on an information recording surface of a second optical information recording medium comprising a protective layer with a thickness of t2' which differs from the thickness t1. It allows the optical pickup apparatus to compatibly recording and/or reproducing information for different optical information recording media such as the combination of BD and HD DVD.

The optical pickup apparatus relating to the present invention may further includes: a reflection optical element arranged in an optical path between the first optical element and the photodetector. It allows to bend the optical path of optical element constructing the optical pickup apparatus. Thus, it miniaturizes the optical pickup apparatus.

In the optical pickup apparatus relating to the present invention, each of the first optical element and the second optical element may include a structural birefringence structure.

Here, the structural birefringence will be explained. The structural birefringence is referred to as birefringence caused by the directional property of fine structures. As the structural birefringence, it is known that, for example, a fine periodic structure (the so-called line and space structure) composed of flat plates having no birefringence characteristic and different refractive indexes which are arranged in parallel in a cycle (<λ/2) sufficiently shorter than the wavelength of light generates a birefringence characteristic (refer to "Principle of Optics", Max Born and Emil Wolf, PERGAMON PRESS LTD.). A refractive index $n_p$ for light having a polarization direction parallel with the groove and a refractive index $n_v$ for light perpendicular to the groove are indicated below.

$$n_p = (tn_1^2 + (1-t)n_2^2)^{1/2} \quad (1)$$

$$n_v = 1/(t/n_1^2 + (1-t)/n_2^2)^{1/2} \quad (2)$$

Where, $n_1$ and $n_2$ indicate respectively the refractive index of the material (the line) for forming the fine periodic structure and the refractive index of the material (the space) for filling up the groove and t indicates a duty ratio of the fine periodic structure. Assuming the line width as $w_1$ and the space width as $w_2$, the following formula is held.

$$t = w_1/(w_1+w_2) \quad (3)$$

The birefringence characteristics of materials such as crystal and calcite are intrinsic to the materials thereof and can be hardly changed, while the birefringence characteristic of the fine periodic structure can be controlled easily by changing the material and shape thereof. Further, when Re indicates a phase difference (retardation amount) between light having a polarization direction parallel with the groove and light having a polarization direction perpendicular to the groove, and h indicates the height (the depth of the groove) of the birefringence structure of the fine periodic structure, the following expression is held.

$$Re = (n_p - n_v)h \quad (4)$$

From these expressions, it can be found that by changing the duty ratio t of the birefringence structure of the fine periodic structure and the height (the depth of the groove) h of the birefringence structure of the fine periodic structure, the phase difference (retardation amount) Re can be changed.

For example, when intending to form an optical element which is a λ/4 wave plate for a 400 nm laser beam, using a resin material having a refractive index of about 1.5 at normal temperature and assuming the line width as 100 nm and the space width as 90 nm, it is necessary to set the height h of the fine structure to 1200 nm. Namely, the aspect ratio becomes about 12. With employing the fine periodic structure, wave plates with the same phase difference but different optical axis orientations can be integrally formed in one body, the loss area which is generated between the wave-plates can be several micrometers or less. Therefore, it can provide a reduction of loss of information recording light and improvement of the property removing unused light.

According to the present invention, an optical pickup apparatus capable of effectively removing unused diffracted light generated from a diffractive structure can be provided.

Figure 2:
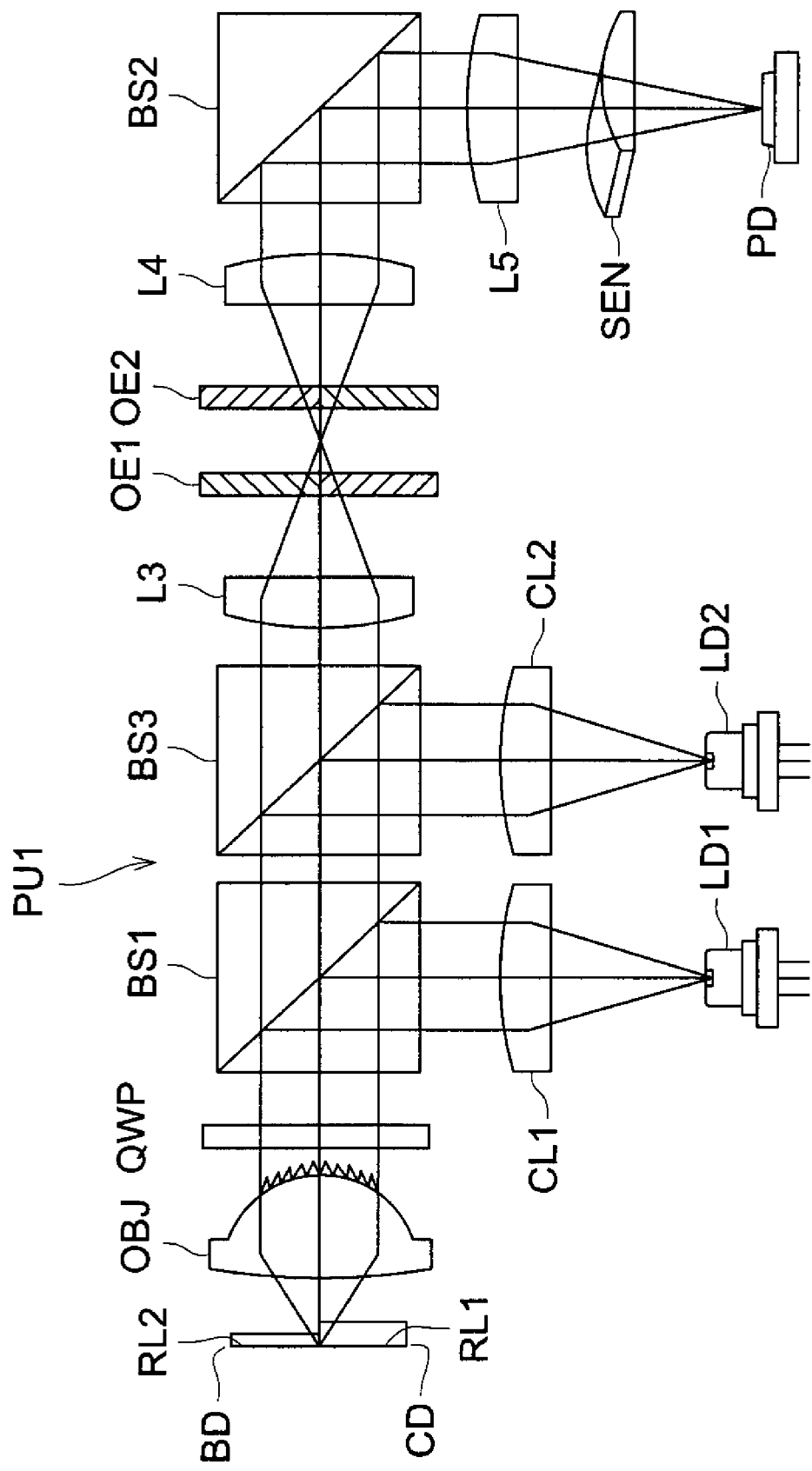
FIG. 2 is a drawing schematically showing the constitution of an optical pickup apparatus PU1 of this embodiment capable of appropriately recording and/or regenerating information for a BD (Blu-ray disc) which is a second optical information recording medium (may be also referred to as an optical disc) and a CD which is a first optical information recording medium.

Hereinafter, the embodiments of the present invention will be explained with reference to the accompanying drawings. FIG. 2 is a drawing schematically showing the constitution of the optical pickup apparatus PU1 of the embodiment for appropriately recording and reproducing information for a BD (Blu-ray disc) which is a second optical information recording medium (may be referred to as an optical disk), and a CD which is a first optical information recording medium. Further, needless to say, the present invention can be also applied to an optical pickup apparatus for a BD (Blu-ray Disc), HD DVD, DVD, CD, and other optical discs.

Figure 3:
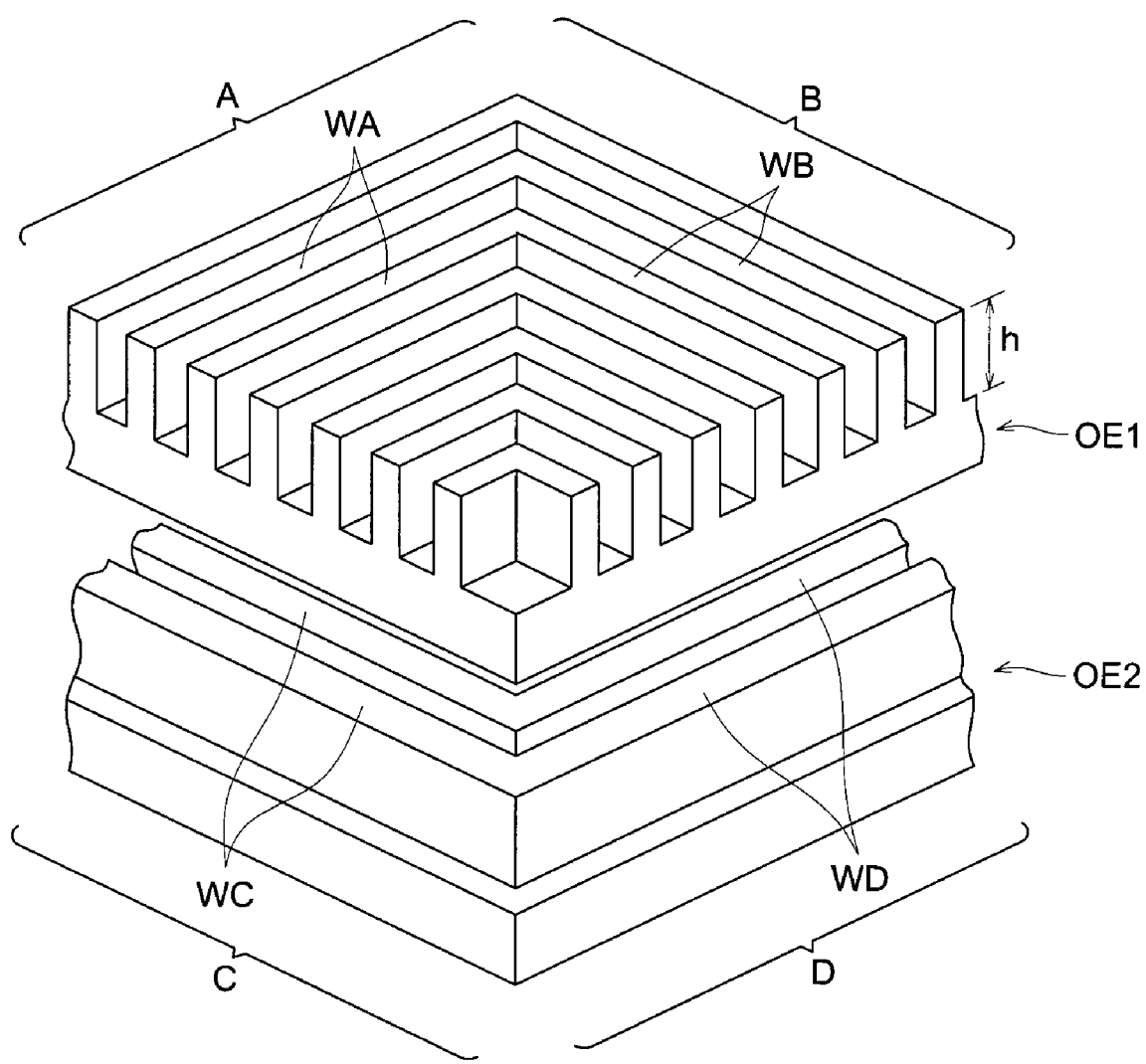
FIG. 3 is a perspective view showing a first wave plate OE1 which is a first optical element and a second wave plate OE2 which is a second optical element.

FIG. 3 is a perspective view showing the first wave plate OE1 which is the first optical element and the second wave plate OE2 which is the second optical element. In FIG. 3, on the optical surface of the first wave plate OE1 in a laminar shape, a first optical area A and a second optical area B are formed on both sides of an optical axis which is not drawn. In other words, the first optical area A and the second optical area B are arranged with sandwiching the optical axis between them. In the first optical area A, a plurality of fine walls WA are arranged at even intervals. In the second optical area B, a plurality of fine walls WB are arranged at even intervals. The respective walls WB and WA cross at right angles so that the ends thereof are joined to each other. The walls WA and WB form a structural birefringence structure with a height of h.

Similarly, on the optical surface of the second wave plate OE2 in a laminar shape, a third optical area C and a fourth optical area D are formed on both sides of the optical axis which is not drawn. In other words, the third optical area C and the fourth optical area D are arranged with sandwiching the optical axis between them. In the third optical area C, a plurality of fine walls WC are arranged at even intervals and face the fine walls WA along the optical axial to be orthogonal to each other when they are viewed in the optical axial direction. In the fourth optical area D, a plurality of fine walls WD are arranged at even intervals and face the walls WB along the optical axial to be orthogonal to each other when they are viewed in the optical axial direction. The respective walls WC and WD cross at right angles so that the ends thereof are joined to each other and the walls WC and WD form a structural birefringence structure with a height of h.

Out of the light flux which have passed through the first wave plate OE1 and second wave plate OE2, the light flux passing through the first optical area A and fourth optical area D and the light flux passing through the second optical area B and third optical area C are changed in the polarization direction by 90° and the light flux passing through the first optical area A and third optical area C and the light flux passing through the second optical area B and fourth optical area D are kept unchanged in the polarization direction. Here, when the intervals between the walls WA to WD and heights thereof are adjusted, a constitution that only specific wavelengths are reacted may be formed such that when light flux of a wavelength of λ2 (350 nm≦λ2≦450 nm) passes, structural birefringence is caused in the constitution or when light flux of a wavelength of λ1 (750 nm≦λ1≦800 nm) passes, structural birefringence is caused in the constitution.

The optical pickup apparatus of the present embodiment is provided with a light-converging optical system including an objective lens. The light-converging optical system includes an optical surface on which a diffractive structure is formed. For example, in FIG. 2, the objective lens OBJ includes the optical surface on which a diffractive structure DS for correcting a spherical aberration caused by the difference between a thickness t2 of 0.1 mm of the protective layer of the BD and a thickness t1 of 1.2 mm of the protective layer of the CD is formed. When a semiconductor laser (a second light source) LD1 is permitted to emit light for recording and/or regenerating information on the BD, the divergent light flux with a wavelength of λ2 emitted from the semiconductor laser LD1, as shown in FIG. 2, passes a first coupling lens CL1, and is converted to a parallel light flux. The parallel light flux is then reflected by a first polarized beam splitter BS1. The reflected light flux passes through a λ/4 wave plate QWP, and the light flux diameter is regulated by an aperture diaphragm not drawn. Then, the light flux passes the diffractive structure DS on the objective lens OBJ, and the 0-th order diffracted light flux of the passing light flux becomes a spot formed on an information recording surface RL1. The objective lens OBJ performs the focusing operation and tracking operation by a biaxial actuator (not drawn) arranged around the objective lens.

The light flux on the information recording surface RL1 is reflected and modulated by the information pit and passes again the objective lens OBJ and λ/4 wave plate QWP. The light flux then passes the first polarized beam splitter BS1 and third polarized beam splitter BS3. The light flux emitted from the third polarized beam splitter BS3 is converted to a convergent light flux by a lens L3 which is a light-converging element. The convergent light passes through the first wave plate OE1, and is converged between the first wave plate OE1 and the second wave plate OE2. Then, the light flux passes through the second wave plate OE2, and is converted to a parallel light flux by a lens L4.

Here, most of the light flux having passes through the first wave plate OE1 and second wave plate OE2 is the reflected light (main light flux) from the information recording surface RL1. Since the polarization direction of the light flux is inclined at 90°, it is reflected by a second polarized beam splitter BS2 which is a polarization splitting means (a polarization splitting optical member). The reflected light flux is converged by a lens L5, is added with astigmatism by a sensor lens SEN. At last, the light flux is converged on the light receiving surface of a photodetector PD. By using the output signal of the photodetector PD, the information recorded on the BD can be read.

On the other hand, when a semiconductor laser LD2 is permitted to emit light for recording and/or reproducing information on the CD, the divergent light flux with a wavelength of λ1 is emitted from the semiconductor laser (first light source) LD2, as shown in FIG. 2. The light flux passes through a second coupling lens CL2 and is converted to a parallel light flux. The parallel light flux, then, is reflected by the third polarized beam splitter BS3, and passes through the first polarized beam splitter BS1. The light flux further passes through the λ/4 wave plate QWP, then the light flux diameter is regulated by an aperture diaphragm which is not drawn. The light flux passes through the diffractive structure DS on the objective lens OBJ, and the first order diffracted light flux of the passing light flux becomes a spot formed on an information recording surface RL2 of the CD. The objective lens OBJ performs the focusing operation and tracking operation by a biaxial actuator (not drawn) arranged around the objective lens.

The light flux on the information recording surface RL2 is reflected and modulated by the information pit and passes again the objective lens OBJ and λ/4 wave plate QWP. The light flux then passes through the first polarized beam splitter BS1 and third polarized beam splitter BS3. The light flux emitted from the third polarized beam splitter BS3 is converted to a convergent light flux by a lens L3 which is a light-converging element, and passes through the first wave plate OE1. The convergent light flux is converged between the first wave plate OE1 and the second wave plate OE2, then passes the second wave plate OE2. Then, the light flux is converted to a parallel light flux by a lens L4.

Figure 5:
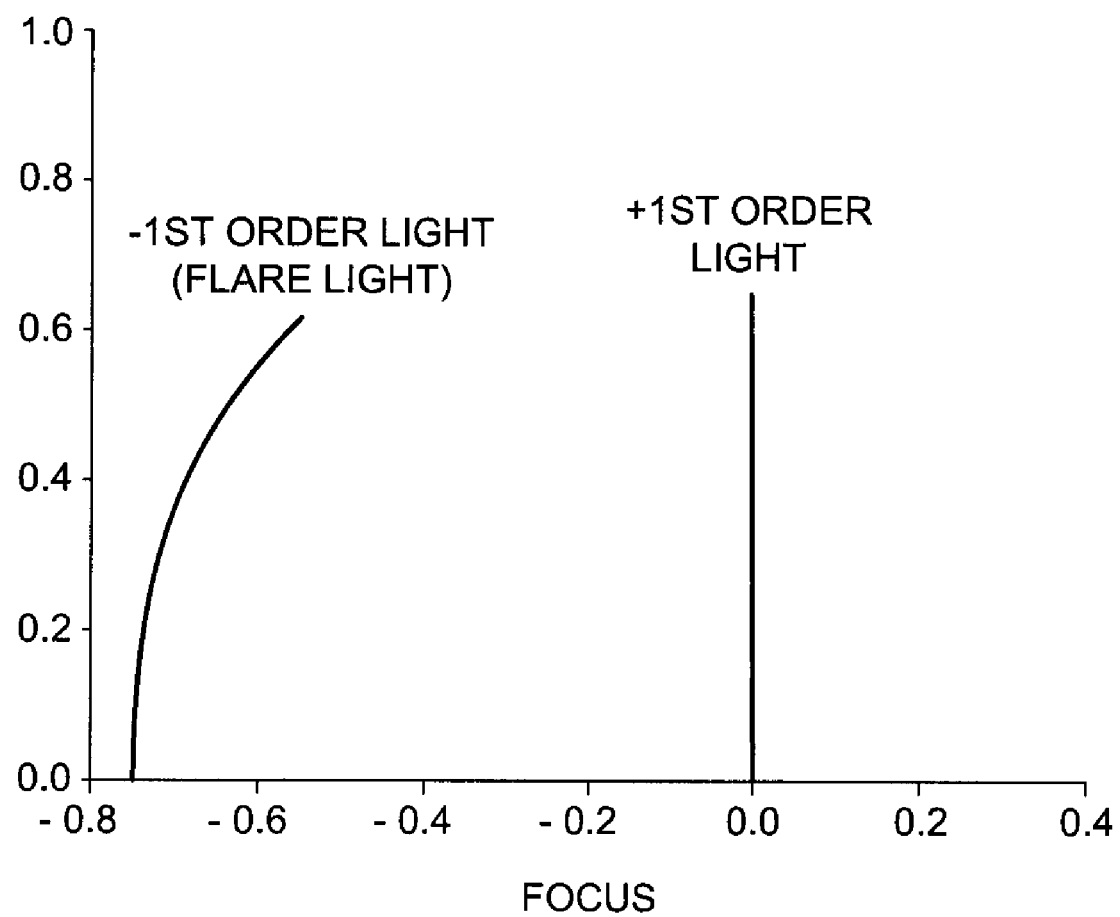
FIG. 5 is a drawing showing an example of the vertical spherical aberration relating to this embodiment.

Here, depending on the diffractive structure DS, even when the diffractive structure is designed so as to maximize the light amount of the diffracted light with the predetermined diffraction order which is generated from the light flux with a wavelength of λ1 passing through the diffractive structure, the diffractive structure often generates the diffracted light flux with the predetermined diffraction order having the maximum light amount and a diffracted light flux with another diffraction order having unignorable light amount. In an example shown in FIG. 5 which is a vertical spherical aberration diagram, −1st order diffracted light having unignorable light amount and the +1st order diffracted light flux with the maximum light amount is generated at the same time. There is an actual situation apt to be generated in an objective lens used when information is compatibly recorded and/or reproduced for BD and CD using the light fluxes of wavelengths of λ1 and λ2 which are different from each other, from the view point of the characteristic of the objective lens. In such a case, when the −1st order diffracted light flux enters into the photodetector PD, there is a fear of an occurrence of a reading error.

However, in the present embodiment, out of the light flux which has passed through the first wave plate OE1 and second wave plate OE2, the first order diffracted light (a main light flux which is the diffracted light flux with the predetermined diffraction order) emitted from the diffractive structure DS has the polarization direction inclined at 90°. Therefore the first order diffracted light is reflected by the second polarized beam splitter BS2 which is a polarization splitting optical means (polarization splitting optical member), then, the reflected light flux is converged by the lens L5. The light flux is added with astigmatism by the sensor lens SEN, and is converged on the light receiving surface of the photodetector PD. By using the output signal of the photodetector PD, the information recorded on the CD can be read. However, the −1st order diffracted light (secondary light flux which is a diffracted light flux with a diffraction order which differs from the predetermined diffraction order) emitted from the diffractive structure DS, is not converged between the first wave plate OE1 and the second wave plate OE2, thus its polarization direction is not changed. Therefore, the diffracted light flux passes through the second polarized beam splitter BS2 which is a polarization splitting optical means (polarization splitting optical member), and does not enter into the photodetector PD. Further, combination of the compatible optical discs is not limited to the combination of BD and CD. For example, a combination of the BD, DVD, and CD and a combination of the BD, HD DVD, DVD, and CD are also available.

As mentioned above, according to the present embodiment, out of the light flux having passed though the first wave plate OE1 and second wave plate OE2, the diffracted light (secondary light flux) with a diffraction order which is different from the predetermined diffraction order is a noise component light and the polarization direction is unchanged. Therefore, the secondary light flux transmits the second polarized beam splitter BS2, thereby does not reach the photodetector PD, thus an occurrence of an error can be suppressed.

For example, when a light flux which has been reflected on an information recording surface of CD as the first optical information recording medium, it is assumed that a diffracted light flux with the predetermined diffraction order emitted by the diffractive structure DS has a diffraction efficiency of DEm, and a diffracted light flux having a maximum diffraction efficiency among diffracted light fluxes with any other diffraction order than the predetermined diffraction order emitted by the diffractive structure DS has a diffraction efficiency of DEs. At that time, light to be a noise component can be removed and the optical pickup apparatus can properly read recorded information from the optical information recording medium, even when the diffraction efficiencies DEm and DEs satisfies DEs/DEm>0.20.

Similarly, even when the first order diffracted light flux entering into the first wave plate OE1 has a light amount Im at a CD side of the first wave plate OE1, −1st order diffracted light flux entering into the first wave plate OE1 has a light amount Is at a CD side of the first wave plate OE1, and the light amount Im and the light amount Is satisfy Is/Im>0.20, the −1st order diffracted light flux to be a noise component can be removed and the optical pickup apparatus can properly read recorded information from the optical information recording medium.

Figure 4:
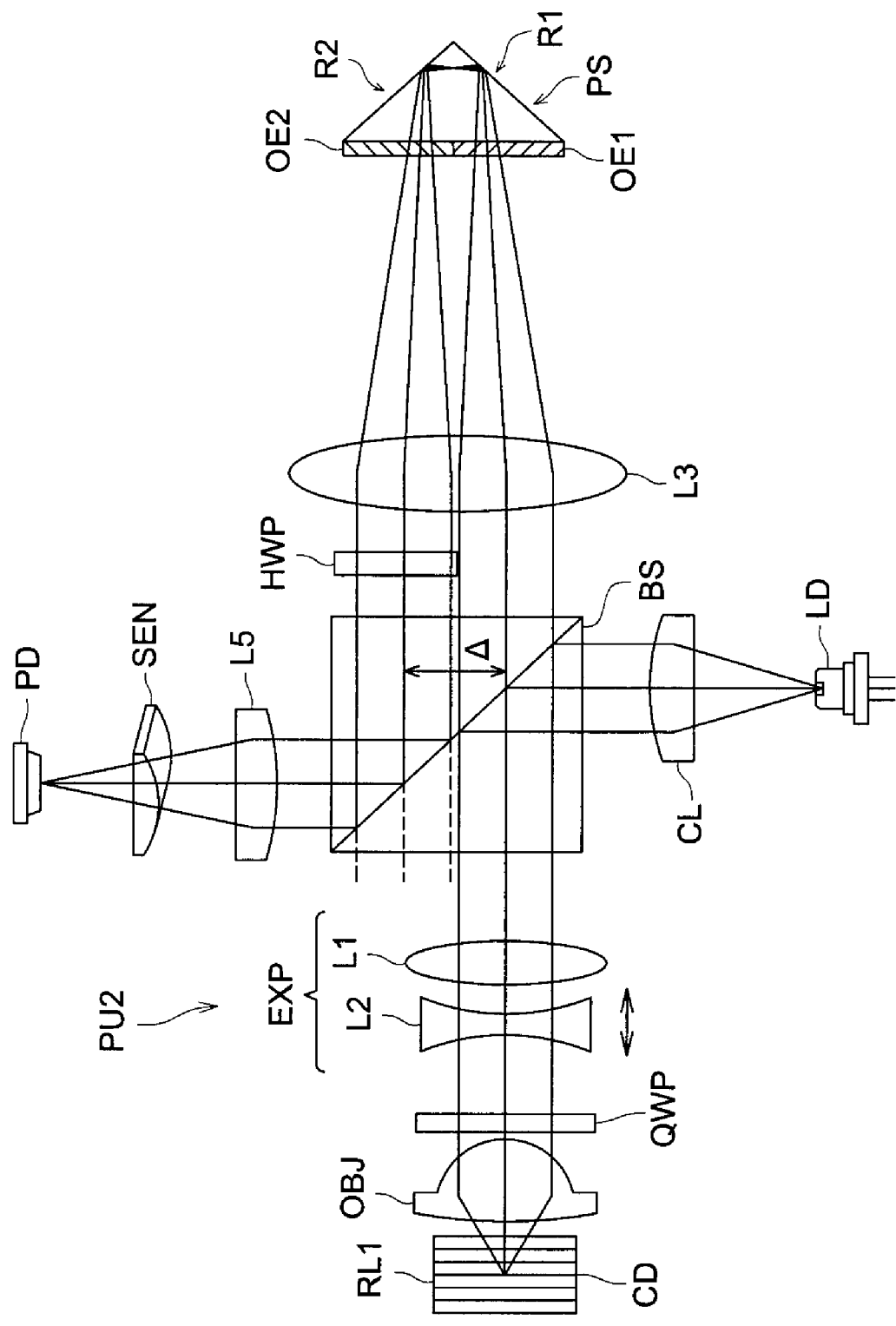
FIG. 4 is a drawing showing a part of the optical pickup apparatus relating to the modified example.

FIG. 4 is a schematic view showing the optical pickup apparatus relating to the modified example. In this modified example, one surface of a prism PS includes an incident surface IP and an emission surface OP and the other two surfaces are reflection surfaces R1 and R2. On the incident surface IP, a first structural birefringence structure OE1 including a first area A and a second area B composed of a plurality of fine walls (refer to FIG. 3) is formed and on the emission surface OP, a second structural birefringence structure OE2 including a third area C and a fourth area D composed of a plurality of fine walls (refer to FIG. 3) is formed. Further, the first structural birefringence structure OE1 includes the first optical area A and second optical area B which are arranged on both sides the optical axis in the perpendicular direction to the sheet of paper of FIG. 3. The second structural birefringence structure OE2 includes the third optical area C and fourth optical area D which are arranged on both sides of the optical axis in the perpendicular direction to the sheet of paper of FIG. 3.

In FIG. 4, the light flux which has been reflected from the CD and has passed through the expander lens EXP, passes through the polarized beam splitter BS. Then, the light flux is converted to a convergent light flux by the lens L3 which is a light-converging element. The convergent light flux passes through the structural birefringence structure OE1 formed on the incident surface IP of the prism PS, and is reflected on the reflection surface R1 to be is converged. The converged light flux is reflected by the second reflection surface R2, and passes through the structural birefringence structure OE2 formed on the emission surface OP. Then, the light flux is emitted from the prism PS, and is converted to a parallel light flux by the lens L3. The parallel light flux furthermore passes the λ/2 wave plate HWP, and then enters the polarized beam splitter BS. Thus only the reflected light from the information recording surface RL1 to be used for recording and/or reproducing information, travels toward the photodetector PD. The constitution other than it is the same as that of the embodiment aforementioned, so that the explanation therefore will be omitted. Further, the lens for transmitting the incident light flux toward the first wave plate OE1 and the lens for transmitting the emitted light flux from the second wave plate OE2 may be formed individually. Further, the optical axis of the light flux traveling toward the lens L3 from the polarized beam splitter BS and the optical axis of the light flux traveling toward the polarized beam splitter BS from the lens L3 may be shifted in parallel. In such a case, the interval between the optical axes may be sufficiently away from each other so that the incident light flux and outgoing light flux can be separated.

The present invention is explained above by referring to the embodiment thereof, though the present invention is not limited to the embodiment aforementioned, and needless to say, it can be changed and modified properly. For example, the present invention is not limited to the optical pickup apparatus for the CD and can be applied to an optical pickup apparatus capable of appropriately recording and/or reproducing information on the BD which is a first optical information recording medium and the HD which is a second optical information recording medium using the same wavelength. In this case, the optical pickup apparatus can converge the light flux of a wavelength of λ1 emitted from the light source on the information recording surface of the first optical information recording medium with a thickness of t1 of the protective layer and the information recording surface of the second optical information recording medium with a thickness of t2' of protective layer which is different from t1 through the light-converging optical system including the objective lens OBJ.

What is claimed is:

1. An optical pickup apparatus for recording and/or reproducing information on a first optical information recording medium comprising a protective layer with a thickness t1, the optical pickup apparatus comprising:

a first light source for emitting a first light flux with a wavelength of λ1;

a light-converging optical system for converging the first light flux onto an information recording surface of the first optical information recording medium, the light-converging optical system comprising an objective lens and an optical surface comprising a diffractive structure which, when the first light flux reflected from the information recording surface of the first optical information recording medium enters into the diffractive structure, emits a main light flux which is a diffracted light flux with a predetermined diffraction order and a secondary light flux which is a diffracted light flux with a diffraction order being different from the predetermined diffraction order;

a first optical element comprising a first optical area and a second optical area which are arranged on both sides of an optical axis;

a second optical element comprising a third optical area and a fourth optical area which are arranged on both sides of the optical axis;

a light-converging element for converging the main light flux at a position between the first optical element and the second optical element;

a polarization splitting optical member for splitting the main light flux and the secondary light flux each emitted from the first optical element and the second optical element; and a photodetector for receiving the main light flux, wherein the optical pickup apparatus records and/or reproduces information by converging the first light flux on an information recording surface of the first optical information recording medium through the light-converging optical system, wherein the first optical area and the fourth optical area provide a first polarization direction with the main light flux passing through the first optical area and the fourth optical area, the second optical area and the third optical area provide a first polarization direction with the main light flux passing through the second optical area and the third optical area, the first optical area and the third optical area provide a second polarization direction with the secondary light flux passing through the first optical area and the third optical area, and the second optical area and the fourth optical area provide a second polarization direction with the secondary light flux passing through the second optical area and the fourth optical area, wherein the main light flux passes through the first optical element and is converged between the first optical element and the second optical element by the light-converging element, and the main light flux passes through the second optical element and enters into the photodetector through the polarization splitting optical member, and wherein the secondary light flux passes through the first optical element and is not converged between the first optical element and the second optical element by the light-converging element, and the secondary light flux passes through the second optical element and does not enter into the photodetector by being branched by the polarization splitting optical member.

2. The optical pickup apparatus of claim 1, wherein the main light flux entering into the first optical element has a light amount Im at a first optical information recording medium side of the first optical element, the secondary light flux entering into the first optical element has a light amount Is at a first optical information recording medium side of the first optical element, and the light amount Im and the light amount Is satisfy Is/Im>0.20.

3. The optical pickup apparatus of claim 1, wherein when the first light flux reflected by the information recording surface of the first optical information recording medium enters into the diffractive structure, a diffracted light flux with the predetermined diffraction order emitted by the diffractive structure has a diffraction efficiency of DEm, a diffracted light flux having a maximum diffraction efficiency among diffracted light fluxes with any other diffraction order than the predetermined diffraction order emitted by the diffractive structure has a diffraction efficiency of DEs, and the diffraction efficiencies DEm and DEs satisfy DEs/DEm>0.20.

4. The optical pickup apparatus of claim 1, further comprising:

a second light source for emitting a second light flux with a wavelength of λ2 (λ2<λ1), wherein the light-converging optical system converges the second light flux on an information recording surface of a second optical recording medium comprising a protective layer with a thickness of t2 (t2<t1).

5. The optical pickup apparatus of claim 1,
wherein the light-converging optical system converges the first light flux on an information recording surface of a second optical information recording medium comprising a protective layer with a thickness of t2' which differs from the thickness t1.

6. The optical pickup apparatus of claim 1, further comprising:
a reflection optical element arranged in an optical path between the first optical element and the photodetector.

7. The optical pickup apparatus of claim 1, wherein each of the first optical element and the second optical element comprises a structural birefringence structure.

* * * * *